Oct. 1, 1963  G. F. QUAYLE  3,105,604
PALLET HANDLING DEVICE
Filed Sept. 9, 1960  3 Sheets-Sheet 1
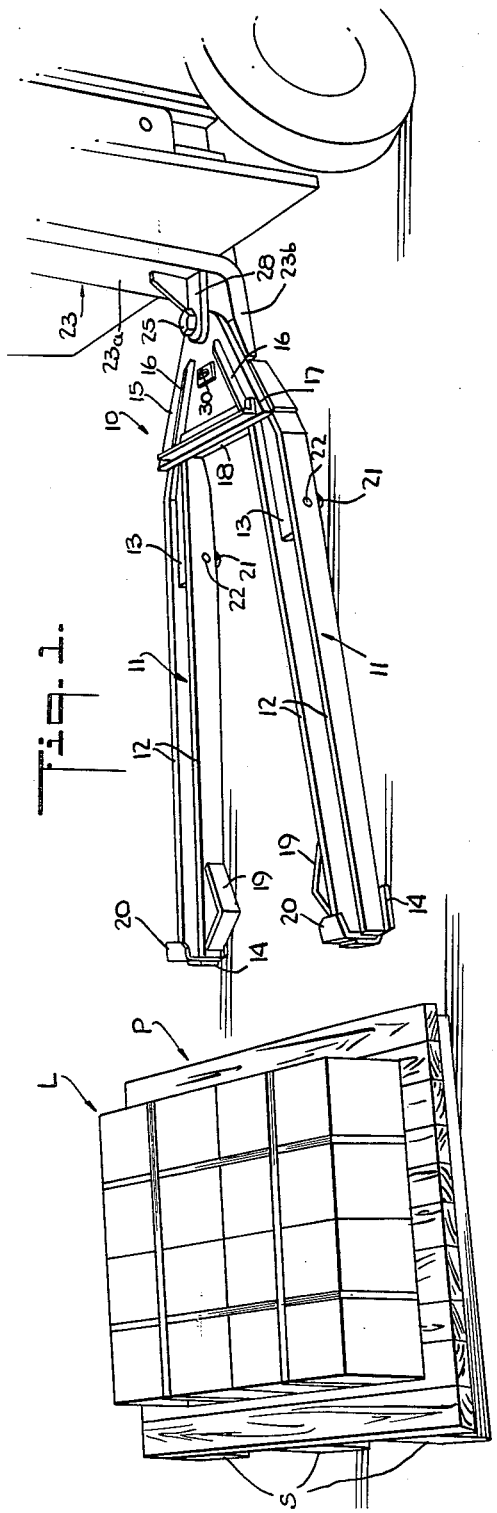
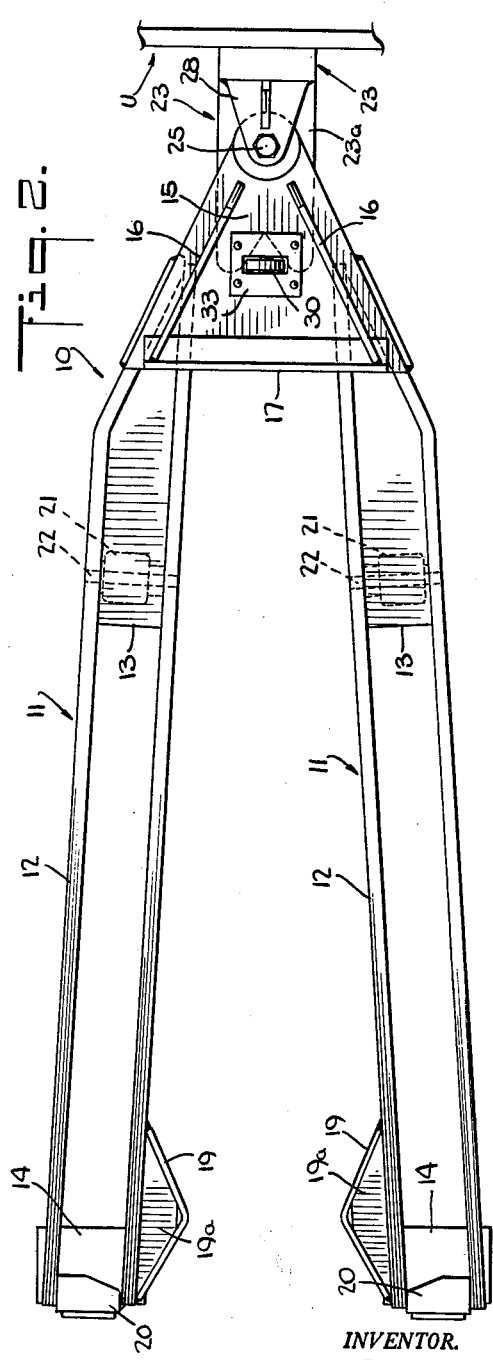
INVENTOR.
GEORGE F. QUAYLE
BY
ATTORNEY

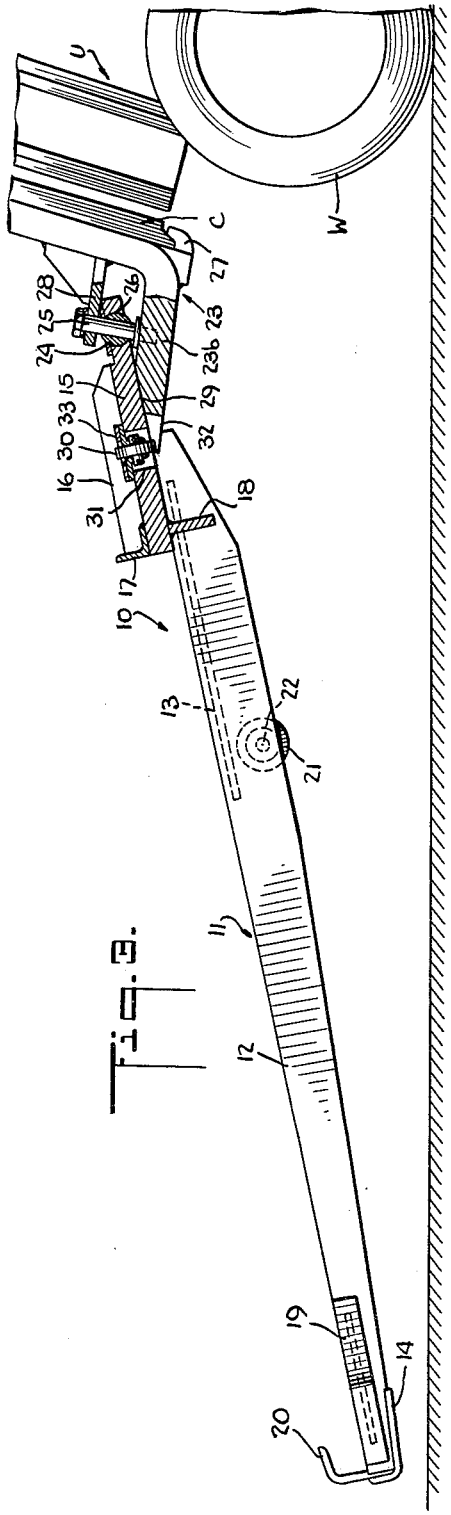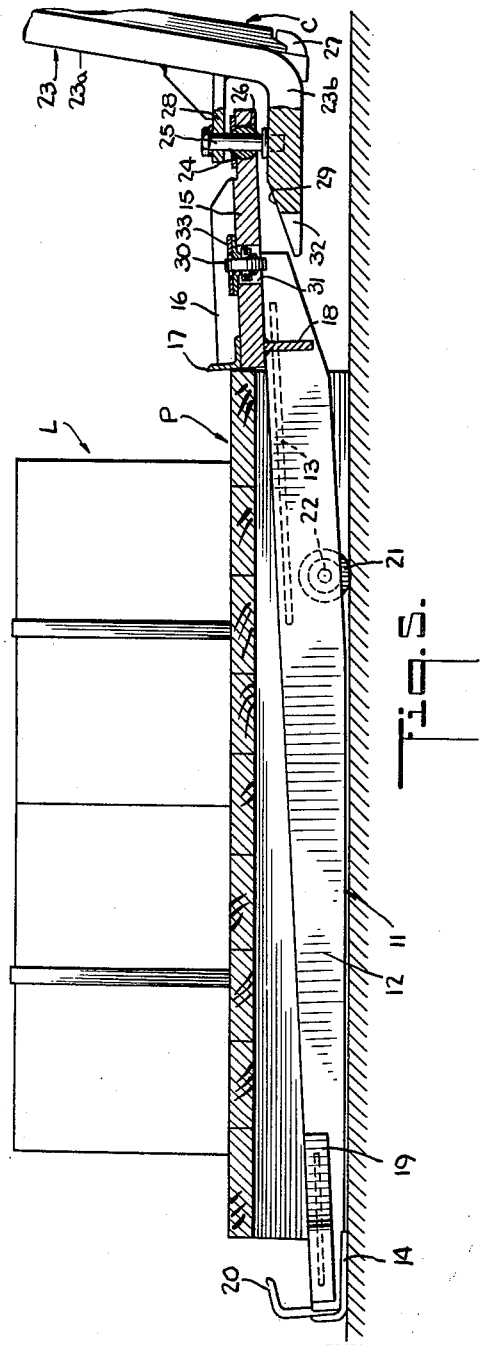

Oct. 1, 1963
G. F. QUAYLE
3,105,604
PALLET HANDLING DEVICE
Filed Sept. 9, 1960
3 Sheets-Sheet 3
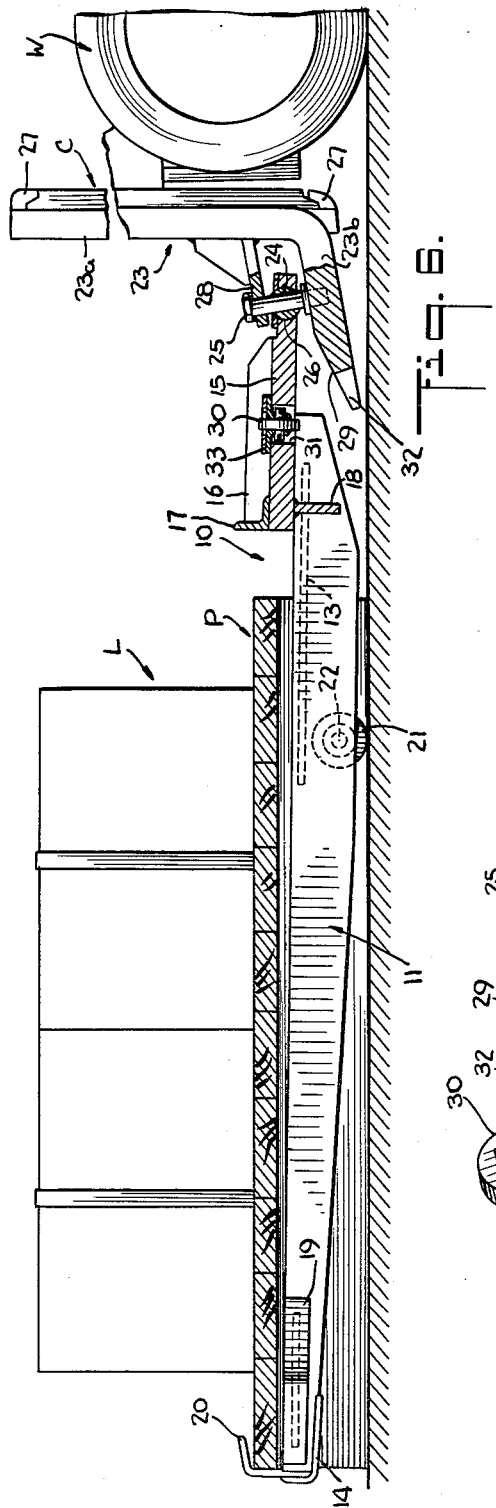
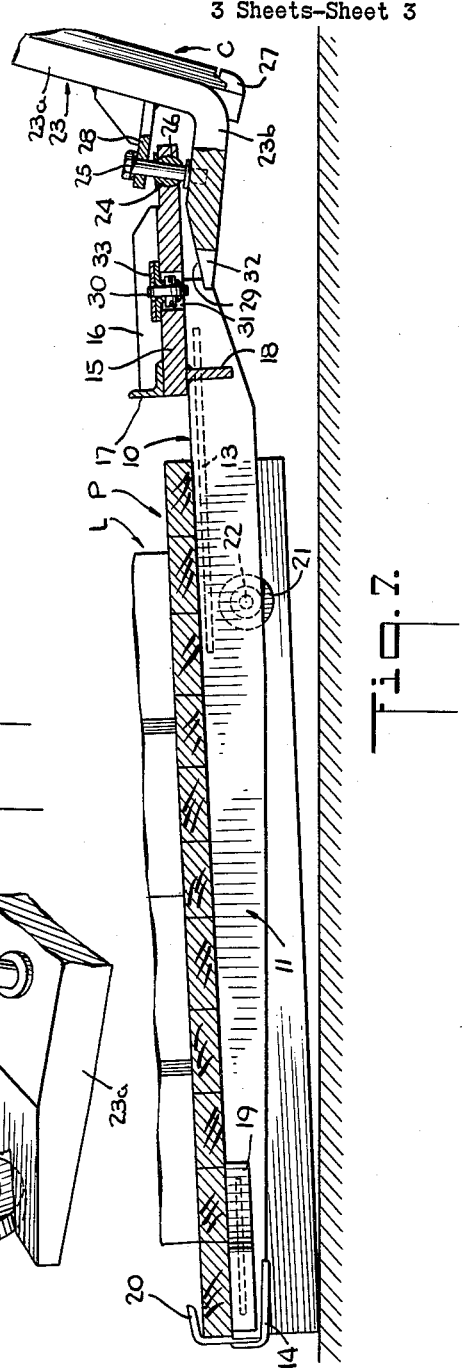
INVENTOR.
GEORGE F. QUAYLE
BY
*H. H. Golden*
ATTORNEY United States Patent Office 3,105,604
Patented Oct. 1, 1963

3,105,604
PALLET HANDLING DEVICE
George F. Quayle, Philadelphia, Pa., assignor to The Yale and Towne Manufacturing Company, Stamford, Conn., a corporation of Connecticut
Filed Sept. 9, 1960, Ser. No. 54,887
9 Claims. (Cl. 214—620)

This invention relates to a pallet-handling attachment for a lift truck. More particularly, the invention relates to an attachment which will permit a heavy pallet-supported load to be transported with one end of the pallet raised and supported on the truck and the other end of the pallet dragging on the floor.

The invention is particularly useful in handling extremely heavy pallet-supported loads which would cause tipping of the lift truck if it were attempted to raise the load completely from the floor in the conventional manner. The attachment is also useful where the load capacity of the floor might be exceeded by the combined weight of the truck and load if a truck of sufficient capacity to raise and support the load completely from the floor were used.

The present invention provides a very simple, inexpensive attachment which may be easily and quickly attached to the load carriage of a conventional lift truck, and which, once attached to the load carriage, may be quickly and easily engaged or disengaged from a pallet by manipulation of the truck and the load carriage of the truck by the conventional controls provided on such a truck. The attachment, therefore, may be engaged or disengaged from the pallet and the pallet moved by operation of the truck without the necessity of the operator of the truck disembarking from the truck.

In accordance with the invention, the attachment includes a simple frame adapted to be inserted through a pallet and having pallet-engaging means on one end thereof for engaging the edge of a pallet and supporting the inserted end of the frame from the pallet when the end is raised relatively to the pallet. Means are provided at the opposite end of the frame for securing the frame to the vertically movable load carriage of the lift truck, and fulcrum means are provided on the underside of the frame intermediate the end thereof on which the frame may be rocked to raise or lower the inserted end of the frame. Thus, once the frame has been inserted through the pallet by maneuvering the truck, the inserted end of the frame may be raised to engage the pallet-engaging means on the edge of the pallet by manipulation of the load carriage to force the opposite end of the frame downwardly so as to rock the inserted end upwardly. Thereafter the opposite end of the frame and pallet may be raised from the floor by manipulation of the load carriage so that one end of the pallet is supported on the truck and the other end is supported on the floor. The pallet can then be dragged in this position by operation of the lift truck.

As a feature of the invention, the frame is pivotally attached to the load carriage so that it may be steered by the lift truck to facilitate insertion thereof through a pallet, and so that the frame and load will properly trail the lift truck as they are dragged by the lift truck.

When the attachment is not being used to support a pallet, it may be easily transported by raising the load carriage a sufficient amount to lift the attachment bodily from the floor. As a further feature of the invention, means are provided for centering the frame relatively to the longitudinal axis of the truck and for preventing transverse swinging of the frame of the attachment when so raised off the floor.

The invention and its advantages having been broadly described, a more detailed description of one embodiment of the invention is given hereafter by reference to the accompanying drawings, wherein:

FIG. 1 is a perspective view of a pallet handling attachment constructed in accordance with the present invention and showing the attachment secured to the load carriage of a lift truck preparatory to it being inserted through and engaged with a loaded pallet, FIG. 2 is a top plan view of the pallet handling attachment shown in FIG. 1, FIG. 3 is a sectional view of the pallet handling attachment showing how the attachment may be lifted bodily from the floor by manipulation of the load carriage of the lift truck so that it may be readily transported by the lift truck when it is not being used to handle a pallet, FIG. 4 is an enlarged view of the means for holding the pallet handling attachment in longitudinal alignment with the lift truck and for preventing horizontal swinging movement of the attachment when it is being transported in the manner as illustrated in FIG. 3, FIG. 5 is a sectional view showing the pallet handling attachment inserted through a loaded pallet preparatory to its engagement with the pallet, FIG. 6 is a sectional view similar to that of FIG. 5, but showing the rear end of the attachment raised by manipulation of the load carriage of the lift truck and engaged with the edge of the upper surface of the pallet, and FIG. 7 is a sectional view similar to that of FIG. 6, but showing the forward end of the attachment and the pallet raised off the floor by manipulation of the load carriage of the lift truck whereby the pallet supported load may be moved by the lift truck with one end of the pallet raised and supported by the lift truck and the other end of the pallet dragging on the floor.

Referring to the drawings, and in particular to FIG. 1, the pallet handing attachment includes a simple frame, generally designated by the reference numeral 10, which is adapted to be inserted through a conventional pallet P supporting a load L.

The frame 10 includes a pair of laterally spaced legs 11. Each leg 11 is conveniently formed of a pair of parallel plates 12 rigidly secured together at their forward ends by plates 13 and at their rear ends by angle members 14 which extend between the plates 12 and are welded or otherwise secured thereto. The legs 11 so formed are rigidly secured together at their forward ends to form an integral frame unit by means of a plate 15 which is welded or otherwise secured to the upper surfaces of the plates 12 of the legs 11. The plate 15 is suitably reinforced by bars 16 and an angle member 17 which are secured to the upper surface of the plate 15, and a bar 18 which is secured to the lower surface of the plate 15.

Angle members 19, suitably reinforced as shown in FIG. 2 by plates 19a, are secured to the inner sides of the legs 11 adjacent the rear ends thereof and serve to help center the frame 10 relatively to the pallet P by engagement thereof with the middle stringer S of the pallet P as the legs 11 are inserted through the spaces between the inner and outer stringers S of the pallet P.

Angle clips 20, welded to the angle plates 14, or otherwise secured to the rear ends of the legs 11, extend above the upper surfaces of the legs 11 so that they may be hooked over the edge of the upper surface of the pallet P when the legs 11 have been inserted through the pallet P and lifted off the floor, as shown in FIG. 6.

Each of the legs 11 is provided with a roller 21 intermediate the ends thereof which extends below the lower surface of the leg so as to form fulcrum means on which the frame 10 may be rocked by the application of a force to the forward end of the frame 10 to raise or lower the rear ends of the legs 11 to engage and disengage the angle clips 20 from the edge of the upper surface of the pallet P. The rollers 21 are suitably journaled on shafts 22 which extend between and are secured to the plates 12 of the legs 11.

The forward end of the frame 10 formed by the plate 15 is adapted to be connected to the load carriage C of a conventional lift truck by means of a generally L-shaped connecting member 23 which is pivotally connected, as best shown in FIGS. 3, 5, 6 and 7, to the plate 15 by means of a ball and socket joint formed by a ball 24 carried by a bolt 25 and a socket 26 formed in the plate 15.

As is well known to those skilled in the art, the load carriage of a conventional lift truck is movable vertically on uprights, such as indicated at U in FIG. 1, which are pivotally mounted on the lift truck forward of the front wheels W for fore and aft tilting movement. As will be described in detail hereafter, the attachment of the pallet handler to the load carriage of the lift truck permits engagement and disengagement of the pallet handler with the pallet by manipulation of the load carriage through the conventional controls provided on the truck. Thus, the pallet handling attachment may be engaged or disengaged from a loaded pallet without the necessity of the operator of the truck disembarking from the truck.

As previously stated, the connecting member 23 is of generally L-shape and includes, as best shown in FIG. 6, upper and lower hook-shaped lugs 27 on the back of the generally vertical leg 23a thereof by which it may be secured to the load carriage C in the same manner that conventional lift forks are mounted on the load carriage. The lower end of the bolt 25 is secured to the generally horizontal leg 23b of the connecting member 23, and the upper end of the bolt 25 is supported by a bracket 28 which extends from and is secured to the generally vertical leg 23a of the connecting member 23.

The ball 24 permits universal pivotal movement so that the frame 10 may pivot both horizontally and vertically relatively to the connecting member 23 and the load carriage C. As best shown in FIG. 3, downward pivotal movement of the frame 10 is limited by engagement of the underside of the plate 15 with a tapered upper surface 29 provided on the end of the horizontal leg 23b of the connecting member 23.

As shown in FIG. 3, the pallet handling attachment may be easily transported by the lift truck when it is not being used to handle a loaded pallet by raising the load carriage C on the uprights U and tilting the uprights rearwardly to lift the pallet handling attachment bodily off the floor. In order to hold the frame 10 in alignment with the longitudinal axis of the lift truck to permit the frame 10 to be aimed toward a pallet, and to prevent dangerous, uncontrolled horizontal swinging of the frame 10 about the ball 24 when the pallet handling attachment is lifted bodily from the floor, the plate 15 is provided with a roller 30, which is mounted in an opening 31 in the plate 15 and extends below the lower surface of the plate 15, as best shown in FIGS. 3 and 4. When the load handling attachment is lifted bodily from the floor and the frame 10 is aligned longitudinally of the truck, the roller 30 engages in a V-shaped slot 32 provided in the edge of the end of the horizontal leg 23b of the connecting member 23 so that the frame 10 is held in longitudinal alignment with the lift truck and prevented from swinging horizontally during transportation thereof by the lift truck. The roller 30 is held engaged in the slot 32 by the weight of the frame 10. Roller 30 is secured to the plate 15 by a suitable bracket 33.

It will be noted that the roller 30 is engageable with the slot 32 only when the frame 10 is lifted bodily from the floor through connecting member 23 and the frame 10 pivots downwardly to engage the underside of plate 15 with the tapered surface 29. When the load carriage C is lowered and the frame 10 engages the ground, as shown in FIG. 5, or the frame 10 is engaged with the pallet P, as shown in FIGS. 6 and 7, the roller 30 is disengaged from the slot 32 so that the frame 10 is free to pivot in a horizontal direction about the ball 24. This allows the frame 10 to be steered as it is inserted through the pallet P, and also allows the frame 10 and the loaded pallet P to properly trail behind the lift truck as the loaded pallet is dragged by the lift truck.

In utilizing the pallet handling attachment to move a heavy pallet supported load, the pallet handling attachment, while supported off the floor, as shown in FIG. 3, is moved to a position of alignment with the pallet P, as shown in FIG. 1. As the frame 10 is held centered relatively to the truck by the engagement of the roller 30 with the slot 32, the frame 10 may be readily aimed toward the pallet to align properly the legs 11 with the spaces between the stringers S of the pallet P. The pallet handling attachment is then lowered to the floor by lowering the load carriage C, and the lift truck moved toward the pallet P to insert the legs 11 of the frame 10 through the spaces between the stringers S of the pallet P until the angle clips 20 extend completely through the pallet P, as shown in FIG. 5.

The uprights U of the lift truck are next tilted forwardly to a generally vertical position to tilt the connecting member 23 to the position shown in FIG. 6, and the load carriage C lowered to apply a downward force to the plate 15 at the forward end of the frame 10 to cause the frame 10 to rock on the rollers 21 to raise the rear end of the frame 10 until the angle clips 20 are aligned with the edge of the upper surface of the pallet P. The lift truck is then backed away from the pallet P to engage the angle clips 20 over the edge of the upper surface of the pallet P, as shown in FIG. 6, so that the rear end of the frame 10 is supported from the pallet P by the angle clips 20.

The load carriage C is next raised on the uprights U to lift the forward end of the frame 10 relatively to the pallet P to take up all clearance between the frame 10 and the pallet P. The uprights U of the lift truck are then tilted backwardly thereby to tilt the connecting member 23 to the position shown in FIG. 7, whereby the forward ends of both the frame 10 and pallet P are raised until the rollers 21 and the forward end of the pallet P are lifted from the floor. In this manner, the actual lifting of the load is performed by tilting of the uprights rather than by raising of the load carriage on the uprights. In conventional lift trucks the rams for tilting the uprights are capable of moving a greater load than the rams for raising the load carriage on the uprights. Thus, by lifting the end of the load by tilting the uprights a much heavier load may be lifted than would be the case if the lifting of the load were performed by raising the load carriage on the uprights. It will be appreciated, however, that the end of lighter loads may be lifted by raising the load carriage on the uprights, and that the attachment may accordingly be used on lift trucks which do not incorporate tiltable uprights.

With the front end of the loaded pallet P and the frame 10 raised and supported on the load carriage C, the loaded pallet may be readily dragged. As the load is partially carried directly by the floor and partially by the lift truck, the danger of tipping of the truck or overloading of the floor is minimized. It will also be noted that the load is supported by the truck closer to the load carriage than would be the case if the load were supported on conventional lift forks. This, of course, decreases the moment arm of the load, thereby further minimizing the danger of tipping of the truck and allowing heavier loads to be handled.

When it is desired to disengage the frame 10 from the pallet P, the procedure as previously described for engaging the loaded pallet is merely reversed.

From the preceding description it can be seen that there is provided a very simple, inexpensive attachment which may be easily and quickly attached to the load carriage of a conventional lift truck, and which, once attached to the load carriage, may be quickly and easily engaged or disengaged from a pallet by manipulation of the truck and the load carriage of the truck by the conventional controls provided on such a truck. When the pallet handling attachment is not being used to handle a pallet, it may be readily transported by being lifted bodily from the floor. The attachment, therefore, may be engaged or disengaged from a pallet, and the pallet moved by operation of the truck, without the necessity of the operator of the truck disembarking from the truck.

While one embodiment of the invention has been shown and described, it will be appreciated that changes and modifications can be made therein without departing from the spirit and scope of the invention.

I now claim:

1. A pallet handler comprising a frame, means fixed to the rear end of said frame for engaging a pallet or skid, said means being formed to support said rear end when it engages said pallet whereby a pulling force may be applied to said pallet by said frame through said means, means at the forward end of said frame to secure said frame to a lift truck carriage for lifting said frame bodily through said forward end means and for applying downward pressure on the forward end of said frame, and fulcrum means on said frame intermediate said front and rear ends of said frame whereby downward pressure on the forward end of said frame raises the rear end of said frame to engage a pallet or skid.

2. A pallet handler comprising a frame, means fixed to the rear end of said frame for engaging and overlapping the edge of the upper surface of a pallet or skid so as to support said rear end from said upper surface of said pallet whereby a pulling force may be applied to said pallet by said frame through said means, means at the forward end of said frame to secure said frame to a lift truck carriage for lifting said frame bodily through said forward end means and for applying downward pressure on the forward end of said frame, and fulcrum means on said frame intermediate said front and rear ends of said frame whereby downward pressure on the forward end of said frame raises the rear end of said frame to engage a pallet or skid.

3. A pallet handler comprising a frame, means fixed to the rear end of said frame for engaging a pallet or skid, said means being formed to support said rear end when it engages said pallet whereby a pulling force may be applied to said pallet by said frame through said means, means at the forward end of said frame to secure said frame to a lift truck carriage for lifting said frame bodily through said forward end means and for applying downward pressure on the forward end of said frame, means at the forward end of said frame cooperating with means on said lift truck carriage for holding said frame centered relatively to the lift truck when said frame is lifted bodily through said forward end means, and fulcrum means on said frame intermediate said front and rear ends of said frame whereby downward pressure on the forward end of said frame raises the rear end of said frame to engage a pallet or skid.

4. A pallet handler comprising a frame, means fixed to the rear end of said frame for engaging a pallet or skid, said means being formed to support said rear end when it engages said pallet whereby a pulling force may be applied to said pallet by said frame through said means, means at the forward end of said frame to secure said frame to a lift truck carriage for lifting said frame bodily through said forward end means and for applying downward pressure on the forward end of said frame, means at the forward end of said frame cooperating with means on said lift truck carriage for holding said frame centered relatively to the lift truck, said means on the forward end of said frame being disconnected from said cooperating means on said lift truck carriage to allow pivoting, swinging of said frame when said frame is lowered by said lift truck carriage, and fulcrum means on said frame intermediate said front and rear ends of said frame whereby downward pressure on the forward end of said frame raises the rear end of said frame to engage a pallet or skid.

5. A pallet handler comprising, an elongated frame adapted to be extended through a pallet, hook shaped means secured to the rear end of said frame for attaching said rear end of said frame to the edge of the upper surface of said pallet when said rear end of said frame is inserted through said pallet and raised relatively to said pallet whereby a pulling force may be applied to said pallet through said hook shaped means, securing means at the forward end of said frame for securing said frame to a lift truck carriage and for applying downward pressure to the forward end of said frame by the lift truck carriage, and fulcrum means on the underside of said frame intermediate the ends thereof whereby the application of downward pressure to the forward end of said frame by the lift truck carriage will raise the rear end of said frame for engaging said hook shaped means with the edge of said pallet.

6. A pallet handler comprising, an elongated frame adapted to be extended through a pallet, attaching means secured to the rear end of said frame for attaching said rear end of said frame to the edge of the upper surface of said pallet when said rear end of said frame is inserted through said pallet and raised relatively to said pallet whereby a pulling force may be applied to said pallet through said attaching means, securing means at the forward end of said frame for securing said frame to a lift truck carriage for horizontal pivotal movement and through which downward pressure may be applied to the forward end of said frame, and fulcrum means on the underside of said frame intermediate the ends thereof whereby the application of downward pressure to the forward end of said frame by the lift truck carriage will raise the rear end of said frame for engaging said attaching means with the edge of said pallet.

7. A pallet handler comprising, an elongated frame adapted to be extended through a pallet, attaching means secured to the rear end of said frame for attaching said rear end of said frame to the edge of the upper surface of said pallet when said rear end of said frame is inserted through said pallet and raised relatively to said pallet whereby a pulling force may be applied to said pallet by said frame through said attaching means, securing means at the forward end of said frame for securing said frame to a lift truck carriage for horizontal pivotal movement and through which downward pressure may be applied to the forward end of said frame, cooperating means on said securing means and said frame for holding said frame centered relatively to said lift truck and preventing horizontal pivotal movement of said frame relatively to the lift truck carriage when the frame is lifted from the floor by the lift truck carriage through said securing means, and fulcrum means on the underside of said frame intermediate the ends thereof whereby the application of downward pressure to the forward end of said frame by the lift truck carriage will raise the rear end of said frame for engaging said attaching means with the edge of said pallet.

8. A pallet handler comprising, an elongated frame adapted to be extended through a pallet, attaching means secured to the rear end of said frame for attaching said rear end of said frame to the edge of the upper surface of said pallet when said rear end of said frame is inserted through said pallet and raised relatively to said pallet whereby a pulling force may be applied to said pallet by said frame through said attaching means, securing means at the forward end of said frame for securing said frame to a lift truck carriage and through which downward pressure may be applied to the forward end of said frame by said lift truck carriage, said securing means providing for horizontal pivotal movement and limited vertical pivotal movement of said frame relatively to the lift truck carriage, cooperating means on said securing means and said frame for preventing horizontal pivotal movement of said frame relatively to the lift truck carriage when the frame is lifted from the floor by the lift truck carriage through said securing means, and fulcrum means on the underside of said frame intermediate the ends thereof whereby the application of downward pressure to the forward end of said frame by the lift truck carriage will raise the rear end of said frame for engaging said attaching means with the edge of said pallet.

9. A pallet handler comprising, an elongated frame adapted to be extended through a pallet, attaching means secured to the rear end of said frame for attaching said rear end of said frame to the edge of the upper surface of said pallet when said rear end of said frame is inserted through said pallet and raised relatively to said pallet whereby a pulling force may be applied to said pallet by said frame through said attaching means, securing means at the forward end of said frame for securing said frame to a lift truck carriage and through which downward pressure may be applied to the forward end of said frame by said lift truck carriage, said securing means providing for horizontal pivotal movement and limited vertical pivotal movement of said frame relatively to the lift truck carriage, cooperating means on said securing means and said frame engageable on downward pivotal movement of said frame to hold said frame centered relatively to the lift truck and prevent horizontal pivotal movement of said frame relatively to the lift truck carriage when the frame is lifted from the floor by the lift truck carriage through said securing means, and fulcrum means on the underside of said frame intermediate the ends thereof whereby the application of downward pressure to the forward end of said frame by the lift truck carriage will raise the rear end of said frame for engaging said attaching means with the edge of said pallet.

References Cited in the file of this patent
UNITED STATES PATENTS

| | | |
|---|---|---|
| 1,636,574 | Perry | July 19, 1927 |
| 1,985,362 | Clyde | Dec. 25, 1934 |
| 2,120,042 | Remde | June 7, 1938 |
| 2,738,222 | Needham | Mar. 13, 1956 |
| 2,851,179 | Vance | Sept. 9, 1958 |